United States Patent
Da Silveira et al.

(10) Patent No.: US 10,972,193 B2
(45) Date of Patent: Apr. 6, 2021

(54) METHOD AND APPARATUS FOR ANTENNA ARRAY CALIBRATION WITH INTERFERENCE REDUCTION

(71) Applicant: Telefonaktiebolaget LM Ericsson (publ), Stockholm (SE)

(72) Inventors: Marthinus Willem Da Silveira, Ottawa (CA); Leonard Lightstone, Ottawa (CA); Neil McGowan, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/642,834

(22) PCT Filed: Sep. 6, 2017

(86) PCT No.: PCT/IB2017/055377
§ 371 (c)(1),
(2) Date: Feb. 27, 2020

(87) PCT Pub. No.: WO2019/048903
PCT Pub. Date: Mar. 14, 2019

(65) Prior Publication Data
US 2020/0351000 A1    Nov. 5, 2020

(51) Int. Cl.
*H04B 17/12* (2015.01)
*H04W 88/08* (2009.01)

(52) U.S. Cl.
CPC ........... *H04B 17/12* (2015.01); *H04W 88/08* (2013.01)

(58) Field of Classification Search
CPC combination set(s) only.
See application file for complete search history.

(56) References Cited

U.S. PATENT DOCUMENTS 5,345,476 A * 9/1994 Tsujimoto ............... H04B 1/123
                                                    333/18
5,745,006 A * 4/1998 Budnik .................. H03F 1/3247
                                                    330/149

(Continued)

FOREIGN PATENT DOCUMENTS

WO         03/90386 A1    10/2003
WO    2009/022866 A1     2/2009

(Continued)

OTHER PUBLICATIONS

Dongarra, J. and Barrett, R., "Stopping Criteria", Templates for the Solution of Linear Systems: Building Blocks for Iterative Methods, 2nd Edition, retrieved from the Internet: http://www.netlib.org/linalg/html_templates/node83.html#SECTION00920000000000000000, Nov. 20, 1995, 2 pages.

(Continued)

*Primary Examiner* — Junpeng Chen
(74) *Attorney, Agent, or Firm* — Nicholson De Vos Webster & Elliott LLP

(57) ABSTRACT

A method and apparatus for calibrating an antenna array are described. Input signals and feedback signals are received, where the feedback signal is a combination of the input signals as captured after having traversed transmit paths and prior to being transmitted at a plurality of sub-arrays. A first interference reduced feedback signals is determined. A current estimation of the impairment function is determined. A second interference reduced feedback signals based on the current estimation of the impairment function, the input signals and the feedback signal. Responsive to determining that the power of the second interference reduced feedback signal satisfies a selection criteria, the current estimation of the impairment function is caused to be used for each one of (Continued)

the plurality of transmit paths for calibration of the antenna array and removing distortion.

27 Claims, 8 Drawing Sheets

(56) References Cited

U.S. PATENT DOCUMENTS

| | | | |
|---|---|---|---|
| 6,615,024 | B1 | 9/2003 | Boros et al. |
| 6,963,742 | B2 | 11/2005 | Boros et al. |
| 7,209,078 | B2 | 4/2007 | Jin et al. |
| 7,286,500 | B1 | 10/2007 | Bhatoolaul et al. |
| 7,292,877 | B2 | 11/2007 | Yoon et al. |
| 7,522,847 | B2 | 4/2009 | Momtaz et al. |
| 8,054,891 | B2 | 11/2011 | Kim et al. |
| 8,107,548 | B2 | 1/2012 | Jeong et al. |
| 8,674,874 | B2 | 3/2014 | Soualle et al. |
| 8,929,934 | B2 | 1/2015 | Chirayil |
| 9,025,575 | B2 | 5/2015 | McGowan et al. |
| 9,094,254 | B2 | 7/2015 | Da et al. |
| 2004/0125235 | A1* | 7/2004 | Kim .................. H04N 5/21 348/607 |
| 2004/0132414 | A1 | 7/2004 | Sendyk et al. |
| 2004/0204109 | A1 | 10/2004 | Hoppenstein |
| 2004/0214604 | A1 | 10/2004 | Yoon et al. |
| 2004/0228417 | A1 | 11/2004 | Kennedy et al. |
| 2005/0207334 | A1 | 9/2005 | Hadad |
| 2006/0039459 | A1 | 2/2006 | Kolze et al. |
| 2006/0240784 | A1 | 10/2006 | Naguib et al. |
| 2007/0177620 | A1 | 8/2007 | Ohmuro et al. |
| 2007/0230638 | A1 | 10/2007 | Griniasty |
| 2008/0159357 | A1 | 7/2008 | Nekoogar et al. |
| 2008/0225929 | A1 | 9/2008 | Proctor et al. |
| 2009/0247095 | A1 | 10/2009 | Pan |
| 2010/0048146 | A1 | 2/2010 | McCallister |
| 2012/0001810 | A1 | 1/2012 | Soualle et al. |
| 2012/0147991 | A1 | 6/2012 | Matsubara et al. |
| 2013/0200951 | A1* | 8/2013 | Irvine .................. H03F 1/3247 330/149 |
| 2014/0133470 | A1* | 5/2014 | McGowan .......... H04W 72/044 370/336 |
| 2014/0133543 | A1* | 5/2014 | Da Silveira ............ H04B 17/12 375/232 |
| 2015/0244440 | A1* | 8/2015 | Da Silveira ......... H04L 25/0204 455/562.1 |
| 2017/0118047 | A1* | 4/2017 | Xie .................. H04L 25/03847 |
| 2019/0319719 | A1* | 10/2019 | McGowan ............. H04B 17/18 |

FOREIGN PATENT DOCUMENTS

| | | |
|---|---|---|
| WO | 2010/038227 A2 | 4/2010 |
| WO | 2014/076630 A1 | 5/2014 |
| WO | 2014/076631 A1 | 5/2014 |
| WO | 2015/128773 A1 | 9/2015 |

OTHER PUBLICATIONS

First Office Action and Search Report from Chinese Patent Application No. 201380059926.1, dated Dec. 24, 2015, 7 pages.
International Preliminary Report on Patentability for Application No. PCT/IB2013/060066, dated May 19, 2015, 6 pages.
International Preliminary Report on Patentability for Application No. PCT/IB2013/060067, dated May 19, 2015, 6 pages.
International Preliminary Report on Patentability, PCT App. No. PCT/IB2017/055377, dated Aug. 21, 2019, 20 pages.
International Preliminary Report on Patentability, PCT App. No. PCT/IB2017/056775, dated Jan. 30, 2020, 20 pages.
International Search Report and Written Opinion for Application No. PCT/IB2013/060066, dated Jan. 23, 2014, 10 Pages.
International Search Report and Written Opinion for Application No. PCT/IB2013/060067, dated Jan. 23, 2014, 10 pages.
International Search Report and Written Opinion for Application No. PCT/IB2017/056775, dated Jun. 6, 2018, 12 pages.
International Search Report and Written Opinion, PCT App. No. PCT/IB2017/055377, dated May 25, 2018, 14 pages.
Non-Final Office Action from U.S. Appl. No. 13/677,781, dated Aug. 13, 2014, 18 pages.
Non-Final Office Action from U.S. Appl. No. 13/894,826, dated Dec. 1, 2014, 10 pages.
Notice of Allowance from U.S. Appl. No. 13/677,781, dated Jan. 30, 2015, 17 pages.
Notice of Allowance from U.S. Appl. No. 13/894,826, dated Mar. 19, 2015, 7 pages.
Notice of Allowance from U.S. Appl. No. 14/678,045, dated Feb. 13, 2017, 29 pages.
Notice of Allowance, U.S. Appl. No. 13/677,781, dated Mar. 10, 2015, 4 pages.
Second Office Action from Chinese Patent Application No. 201380059926, dated May 24, 2016, 11 pages.
Thomas T. A., et al., "CSI Reference Signal Designs for Enabling Closed-Loop MIMO Feedback," 2010 IEEE 72nd Vehicular Technology Conference, Fall, Sep. 1, 2010, pp. 1-5.
Written Opinion of the International Preliminary Examining Authority (Chapter II), PCT App. No. PCT/IB2017/055377, dated May 10, 2019, 7 pages.
Written Opinion of the International Preliminary Examining Authority, PCT App. No. PCT/IB2017/056775, dated Sep. 23, 2019, 4 pages.
Zheng J., et al., "A Novel Timing and Frequency Synchronization Scheme for MIMO OFDM System," Wireless Communications, Networking and Mobile Computing, WICOM 2007, International Conference on, Sep. 21, 2007, pp. 420-423.
Office Action, EP App. No. 17780520.7, dated Dec. 23, 2020, 7 pages.

* cited by examiner

METHOD AND APPARATUS FOR ANTENNA ARRAY CALIBRATION WITH INTERFERENCE REDUCTION

CROSS-REFERENCE TO RELATED APPLICATIONS

This application is a National stage of International Application No. PCT/IB2017/055377, filed Sep. 6, 2017, which is hereby incorporated by reference.

TECHNICAL FIELD

Embodiments of the invention relate to antenna array calibration; and more specifically, to antenna array calibration with interference reduction.

BACKGROUND

Antenna arrays have been widely used in wireless mobile networks for directional signal transmission and reception with an increased gain compared to an omni-directional antenna. The increased gain translates into a higher cell density and data throughput. An antenna array needs to be calibrated across its sub-array paths to remove any linear phase and/or amplitude distortions (hereafter simply referred to as phase distortion) in these paths. If the transmission beam pattern is out of phase or otherwise phase-distorted, the signal transmitted by a base station (e.g., a radio base station (RBS)) at normal transmission power may not be correctly received and decoded by a user terminal. To compensate for the phase distortions, the base station may transmit data at a higher power level; however, increasing the transmission power acts as a load to the system, causing a reduction to the power that can be allocated to other terminals. In addition, the signal transmitted at higher power may interfere with other terminals, causing a reduction in signal quality.

Several techniques exist for antenna array calibration. In some techniques, calibration signals specially selected are injected into the antenna array to perform the calibration. In these techniques, the signals are selected with controlled and known signal properties. However these techniques require the interruption or significant degradation of normal traffic signal in order to perform the calibration. An additional problem caused by these techniques is the need for compatibility with different system configurations of multiple carriers and multiple communication standards. If system configuration is not performed adequately with respect to a carrier requirements or communication standard requirements, the use of the special calibration signals may result in standards non-compliance and/or violation of regulatory requirements.

Some techniques for antenna array calibration use normal outbound traffic signals for calibration. The term "outbound traffic signals," as used herein, refers to the traffic signals that are to be transmitted from the antenna array to other network nodes or user equipment. In these techniques the antenna array combines outbound traffic signals across multiple transmit paths to form a feedback signal. The feedback signal is used in addition to reference signals (which are outbound traffic signals as captured before entering the transmit paths) to compute an impairment transfer function. Based on the impairment transfer function, the transmit paths are configured to output the outbound traffic signals while reducing phase distortion and transmission power.

In these techniques, only normal traffic signals are used for calibration consequently avoiding normal traffic interruption and maintaining standards compliance. In some cases, normal traffic signals can be highly correlated between the different transmit paths of the antenna array. For example, correlation between various transmit paths can occur when single user beam forming of cell shaping is performed. Traffic signal dithering can be used to introduce variations within the traffic signals and enable calibration of the antenna array even in the case of correlated traffic signals. However, traffic signal dithering requires additional signal capture time and longer averaging operations in order to achieve calibration with great accuracy.

Thus, the existing techniques of antenna array calibration have a significant negative impact on signal quality and/or data throughput.

SUMMARY

Embodiments of the invention calibrate an antenna array of a base station using outbound traffic signals. The calibration removes distortion incurred by the transmit paths in a base station. The antenna array includes a plurality of sub-arrays coupled to the transmit paths for transmitting outbound traffic signals to a wireless network.

One general aspect includes a method of calibrating an antenna array of a base station to remove distortion incurred by input signals within a plurality of transmit paths in the base station, the antenna array including a plurality of sub-arrays, where each one of the plurality of sub-arrays is coupled to a respective one from the plurality of transmit paths for transmitting an input signal from the input signals to a wireless network, the method including the steps of: (a) receiving the input signals prior to the input signals entering the transmit paths; (b) for each one of the plurality of transmit paths, setting an impairment function to a previous estimation of the impairment function; (c) receiving a feedback signal, where the feedback signal is a combination of the input signals as captured after having traversed the transmit paths and prior to being transmitted at the plurality of sub-arrays; (d) determining a first interference reduced feedback signals based on the previous estimation of the impairment function for each one of the plurality of transmit paths, the input signals and the feedback signal; (e) determining for each one of the plurality of transmit paths, a current estimation of the impairment function based on the interference reduced feedback signal; (f) determining a second interference reduced feedback signals based on the current estimation of the impairment function for each one of the plurality of transmit paths, the input signals and the feedback signal; (g) determining whether a power of the second interference reduced feedback signal satisfies a selection criteria; and (h) responsive to determining that the power of the second interference reduced feedback signal satisfies the selection criteria, causing the use of the current estimation of the impairment function for each one of the plurality of transmit paths for calibration of the antenna array of the base station and removing distortion.

One general aspect includes a network element for calibrating an antenna array of a base station to remove distortion incurred by input signals within a plurality of transmit paths in the base station, the antenna array including a plurality of sub-arrays, where each one of the plurality of sub-arrays is coupled to a respective one from the plurality of transmit paths for transmitting an input signal from the input signals to a wireless network, the network element including: a non-transitory computer readable storage medium to store instructions; and a processor coupled with the non-transitory computer readable storage medium to process the stored instructions to (a) receive the input signals prior to the input signals entering the transmit paths; (b) for each one of the plurality of transmit paths, set an impairment function to a previous estimation of the impairment function; (c) receive a feedback signal, where the feedback signal is a combination of the input signals as captured after having traversed the transmit paths and prior to being transmitted at the plurality of sub-arrays; (d) determine a first interference reduced feedback signals based on the previous estimation of the impairment function for each one of the plurality of transmit paths, the input signals and the feedback signal; (e) determine for each one of the plurality of transmit paths, a current estimation of the impairment function based on the interference reduced feedback signal; (f) determine a second interference reduced feedback signals based on the current estimation of the impairment function for each one of the plurality of transmit paths, the input signals and the feedback signal; (g) determine whether a power of the second interference reduced feedback signal satisfies a selection criteria; (h) responsive to determining that the power of the second interference reduced feedback signal satisfies the selection criteria, cause the use of the current estimation of the impairment function for each one of the plurality of transmit paths for calibration of the antenna array of the base station and removing distortion.

One general aspect includes a non-transitory computer readable storage medium that provide instructions, which when executed by a processor of a base station, cause said processor to calibrate an antenna array of a base station to remove distortion incurred by input signals within a plurality of transmit paths in the base station, the antenna array including a plurality of sub-arrays, where each one of the plurality of sub-arrays is coupled to a respective one from the plurality of transmit paths for transmitting an input signal from the input signals to a wireless network, by performing operations including: (a) receiving the input signals prior to the input signals entering the transmit paths; (b) for each one of the plurality of transmit paths, setting an impairment function to a previous estimation of the impairment function; (c) receiving a feedback signal, where the feedback signal is a combination of the input signals as captured after having traversed the transmit paths and prior to being transmitted at the plurality of sub-arrays; (d) determining a first interference reduced feedback signals based on the previous estimation of the impairment function for each one of the plurality of transmit paths, the input signals and the feedback signal; (e) determining for each one of the plurality of transmit paths, a current estimation of the impairment function based on the interference reduced feedback signal; (f) determining a second interference reduced feedback signals based on the current estimation of the impairment function for each one of the plurality of transmit paths, the input signals and the feedback signal; (g) determining whether a power of the second interference reduced feedback signal satisfies a selection criteria; and (h) responsive to determining that the power of the second interference reduced feedback signal satisfies the selection criteria, causing the use of the current estimation of the impairment function for each one of the plurality of transmit paths for calibration of the antenna array of the base station and removing distortion.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DESCRIPTION OF EMBODIMENTS

Figure 1:
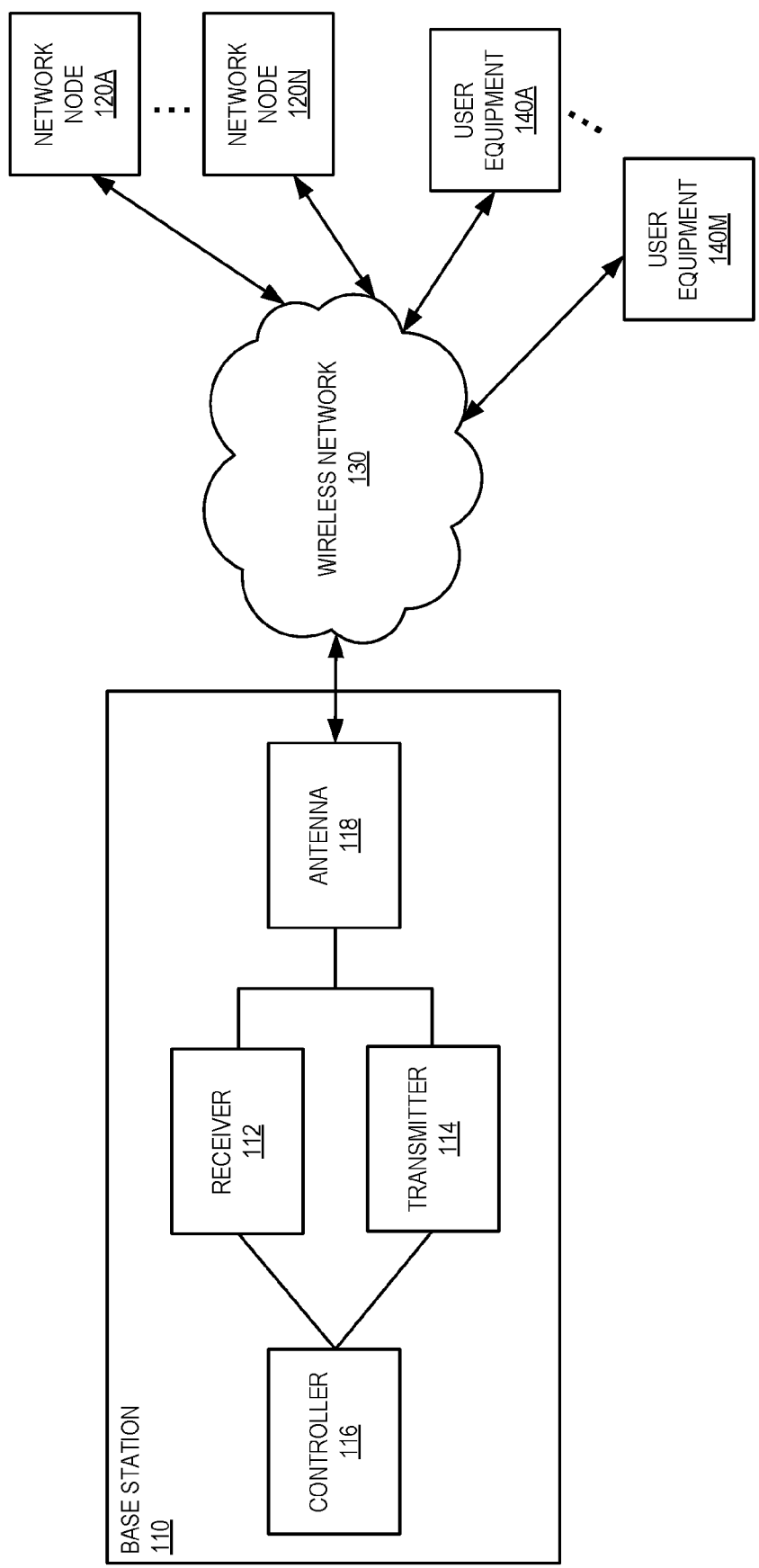
FIG. 1 illustrates a block diagram of an exemplary network architecture in accordance with some embodiments.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Embodiments of the invention provide for antenna array calibration techniques with interference reduction. The techniques calibrate the antenna array in the transmit direction. The calibration techniques enable an adaptive cancelation of correlated signals from a feedback signal used in the calibration process. As will be apparent from the following description, this approach allows for shorter capture times and less processing power for achieving a desired level of calibration accuracy in comparison with previously existing calibration techniques.

According to one embodiment, the antenna array described herein combines input signals across multiple transmit paths to form a feedback signal. In addition, the input signals are captured before they enter the transmit paths as a set of reference signals. An interference reduced feedback signal is determined based on a previous estimation of an impairment function for each one of the transmit paths, the input signals and the feedback signal. The interference reduced feedback signal is de-convolved with the set of reference signals to determine an updated impairment transfer function for each of the transmit paths. Based on the updated impairment transfer function, a set of equalizer weights are computed for each transmit path to correct for the impairment.

In some embodiments, the calibration techniques do not use any special calibration signal injected into the base station (e.g., a radio base station (RBS)). This allows an RBS to be in full compliance with applicable standards. As normal outbound traffic signals are used for calibration, the calibration does not interrupt or interfere with the ongoing traffic signals, and therefore does not impact system availability, system throughput, and signal quality. In addition, as the calibration does not incur interruption of normal system operation, the calibration can be performed at all times to account for changes in operating conditions such as temperature changes. In other embodiments, the calibration technique may use special calibration signals injected into the base station in addition to outbound traffic signals.

In one embodiment, the calibration can be performed entirely within the radio unit of a base station using a feedback signal from an antenna, without involving other parts of the base station and the network. Confining the calibration within the radio unit can simplify the hardware and software design and lower the cost of the system. Moreover, the radio unit in a base station is typically multi-standard, which also means that the radio unit is agnostic to the specific radio standard (i.e., 5th generation wireless systems (5G), 4th generation wireless systems (4G), Long Term Evolution (LTE), Global System for Mobile Communications (GSM), Code Division Multiple Access (CDMA), Wideband CDMA (WCDMA), etc.) being implemented by the base station. Therefore, performing the calibration in the radio unit maintains the multi-standard characteristic of the base station. It is to be appreciated that embodiments of the invention are not so limited; in some embodiments, the calibration can be performed by the radio unit and other parts of the base station, e.g., the baseband unit. However, the digital circuitry in the baseband unit is generally multi-standard in hardware, but typically uses unique software and configuration specific to each radio standard. Moreover, performing the calibration in the radio unit and the baseband unit may incur additional interconnects and coordination between these two units. Therefore, performing the calibration in the baseband unit or multiple units of the base station may be more costly than performing the calibration entirely in the radio unit. The calibration technique described herein may be implemented in both time-division duplex (TDD) and frequency-division duplex (1-DD) systems.

The calibration techniques described herein are flexible and can be used under a large range of system conditions, such as wide bandwidth, multiple carriers and multiple technologies. The calibration techniques significantly improve system performance even with low signal-to-noise ratio in the feedback signal. The calibration techniques can automatically handle large relative delay differences between the transmit paths. In addition, the calibration techniques can automatically handle a system with ill-conditioned (i.e., correlated) transmit signals. Thus, it is not necessary to coordinate the calibration with any other parts of the RBS or network activities.

FIG. 1 illustrates a block diagram of an exemplary network architecture in which an embodiment of the invention may operate. A base station 110, such as an RBS, is coupled to one or more network nodes 120A-N (e.g., other base stations) and/or one or more user equipments 140A-M (e.g., mobile phones, tablets, Internet of Things (IoT) devices, etc.) via a wireless network 130. The wireless network 130 operates in compliance with a wireless communication standard, such as 5G, 4G, LTE, GSM, CDMA, WCDMA, etc. The base station 110 includes a receiver 112, a transmitter 115, both of which are coupled to an antenna 118 for signal transmission and reception. The receiver 112 and the transmitter 115 may also be coupled to a controller 116 that controls the transmission and reception operations. It is understood that the base station 110 of FIG. 1 is a simplified representation; additional circuitry may be included in a base station that performs the antenna array calibration described herein.

Figure 2:
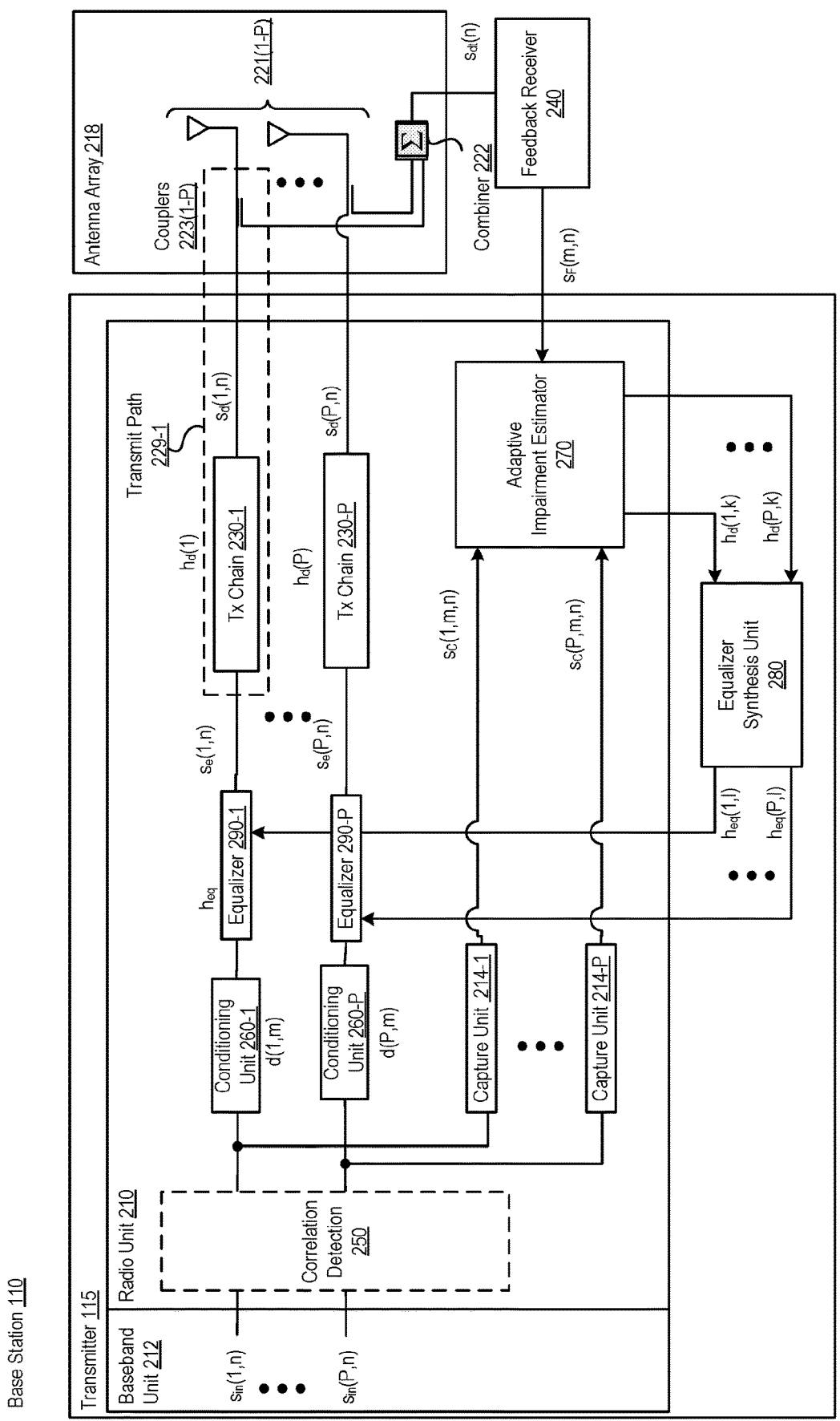
FIG. 2 illustrates an exemplary block diagram of a portion of a base station that performs antenna array calibration in accordance with some embodiments.

FIG. 2 illustrates an exemplary block diagram of a portion of the transmitter 115 in the base station 110 that performs antenna array calibration according to one embodiment. In this embodiment, the transmitter 115 includes a baseband unit 212 and a radio unit 210 coupled to an antenna array 118 that has multiple sub-arrays 221(1-P). The radio unit 210 is responsible for converting baseband signals into radio frequency (RF) signals for transmission. The sub-arrays 221 (1-P) are operative to carry outbound signals that have been phase-controlled for transmission. The outbound signals include traffic signals. Each of the traffic signals is a "normal traffic signal" as the signal carries data or other communication information for transmission to another network node or user equipment. In some embodiments, the outbound signals may include traffic signals and special calibration signals that were injected into the base station 110 for performing antenna array calibration. The sub-arrays 221(1-P) are coupled to the radio unit 210 of the base station 110 via respective antenna ports and corresponding radio transmit ports at the radio unit 210 (not illustrated).

Between the antenna ports and the radio transmit ports are multiple feeders (not illustrated), one for each transmit path. The term "transmit path" as used herein refers to the path traversed by a signal after the signal enters one of the transmit (Tx) chains 230(1-P), for example Tx Chain 230-1, and before the signal enters one of the sub-arrays 221(1-P). An example of a transmit path is shown in FIG. 2 by the dotted box labeled as a transmit path 229-1. The transmit path 229-1 includes a transmit (Tx) chain 230-1 and all of the interconnect including a feeder (not illustrated) up to a coupler 223-1 inside the antenna array 118. In practice the transmit path 229-1 may also include duplexers, amplifiers (e.g., tower mounted amplifiers (TMAs), combiners, diplexers, etc., such as would be appreciated by one skilled in the art. There is a one-to-one correspondence between a transmit chain and a transmit path. The transmit chains 230(1-P) are the boundary between digital processing and analog processing in the base station 110, as each one of the transmit chains 230(1-P) converts a signal from digital to analog. Each one of the transmit chain 230(1-P) includes a number of analog components, such as one or more digital-to-analog converters, mixers, filters, power amplifiers, etc.

The analog components in the transmit chains 230(1-P), together with the feeders and other components along the analog portion of the transmit paths up to the antenna ports, generally cause linear phase and/or linear amplitude impairment to the signals that traverse these paths. Significant non-linearities in the transmit path (such as the power amplifier) are typically taken care of by non-linear pre-distortion techniques.

The baseband transmit signals ($s_{in}(1,n), \ldots, s_{in}(P,n)$) are input into the radio unit 210 to be processed for calibration and transmission. In the following description the baseband transmit signals ($s_{in}(1,n), \ldots, s_{in}(P,n)$) will be referred to as the "input signals." The notation i={1, ..., P} represents the transmit path index, where P is the total number of transmit paths, and n is the time-domain sample index, where N is the number of data samples in each data block. Each of the input signals ($s_{in}(1,n), \ldots, s_{in}(P,n)$) is a signal to be transmitted to a wireless network via one of the sub-arrays 221(1-P) by traversing a respective transmit path from the transmit paths 229(1-P). In the description below, the lower-case letters indicate time-domain signals or values, and the upper-case letters indicate frequency-domain signals or values.

To calibrate and compensate for the linear impairment of phase and/or amplitude incurred by signals in the transmit paths, input signals ($s_{in}(1,n), \ldots, s_{in}(P,n)$) are simultaneously captured (via the capture units 214-1 to 214-P) when these signals enter the radio unit 210. The P input signals ($s_{in}(1,n), \ldots, s_{in}(P,n)$) are captured in m blocks of N samples per block and stored as the signals $s_c(1,m,n), \ldots, s_c(P,m,n)$. The signals, $s_c(1,m,n), \ldots, s_c(P,m,n)$, at the capture points, have not been impaired by the components in the transmit paths, and, therefore, are suitable for determining reference signals for performing the calibration. While in the illustrated example of FIG. 2, the input signals are captured prior to the conditioning units 260(1-P) and prior to the equalizers 290(1-P), in other examples, the capture can be performed after the conditioning units or after the equalizers without departing from the scope of the present invention. When the computation of the impairment function is performed based on signals that are captured before the conditioning units a modification of the captured input signals with the corresponding conditioning operation (d(i,m)) and convolution with the equalizer functions ($h_{eq}$) may be performed at the adaptive impairment estimator 270 to obtain the reference signals. In a similar manner, when the computation of the impairment function is performed based on signals that are captured before the equalizers a convolution of the captured input signals with the equalizer functions ($h_{eq}$) may be performed at the adaptive impairment estimator 270 to obtain the reference signals.

The input signals traverse the different components of the transmitter (e.g., the conditioning units, the equalizers, the Tx chains, the feeders) to be output as outbound signals at the subarrays 221(1-P) for transmission towards a wireless network. The outbound signals are coupled by respective couplers 223(1-P) and combined (i.e., summed up) by a combiner 222 in the antenna array 118 to produce a single feedback signal $s_{dt}(n)$. This feedback signal is routed to a feedback receiver 240 through an antenna calibration port (not illustrated) and a corresponding radio calibration port (not illustrated) at the radio unit 210. In some embodiments, the feedback signal includes a combination of traffic signals only. In other embodiments, the feedback signal includes a combination of special calibration signals and traffic signals.

The feedback signal $s_{dt}(n)$ is formed after each input signal has gone through the various components of the transmitter, in particular the analog part of the transmit path. Thus, the feedback signal, $s_{dt}(n)$, is a sum of the impaired signals. The calibration technique described herein uses the unimpaired reference signals and the impaired sum of the traffic signals to estimate the impairment in the transmit path and to thereby remove the impairment from the outbound signals that is output at the antenna subarrays 221 (1-P). The impairment is removed after the equalizers 290(1-P) are programmed with equalizer taps calculated based on the estimated impairments. In some cases, only the differences in the impairments of the transmit paths need to be removed from the outbound signals to obtain good system performance.

The feedback signal $s_{dt}(n)$ from the combiner 222 is sent to the feedback receiver 240, which down-converts and digitizes the feedback signal to produce a digitized feedback signal $s_F(m,n)$. The digitized feedback signal $s_F(m,n)$ is sent to an adaptive impairment estimator 270 to be processed with the reference signals $s_c(1,m,n), \ldots, s_c(P,m,n)$. The adaptive impairment estimator 270 is operative to determine, based on the reference signals and the feedback signal, the impairment affecting the input signals in the transmit path.

In some embodiments, traffic signals transmitted through the antenna array may be correlated rendering the use of traffic signals for performing the calibration of the antenna array challenging. Several mechanisms can be used to perform calibration of the antenna array when the traffic signals are correlated. In some embodiments, special calibration signals or training signals are used for performing the calibration. In these embodiments, each special calibration signal transmitted over a transmit path is different from the special calibration signals transmitted over the other transmit paths of the transmitter. The special calibration signals can be injected at a low power level relative to the traffic signals with a minimum impact on the transmit signal error vector magnitude (EVM) and the decoding performance of the user equipment receiving the signals. In other embodiments, instead of injecting special calibration signals, the traffic signals can be conditioned by slight phase and/or amplitude variations as a function of time to be used in the calibration mechanism without the need of special calibration signals.

Referring to FIG. 2, the base station 110 may also include a correlation detection unit 250 to detect a degree of correlation between the input signals $s_{in}(1,n), \ldots, s_{in}(P,n)$. The correlation detection may be performed by a cross-correlation computation between each input signal and all of the other input signals.

When the correlation is determined to be below a correlation threshold, the input signals, $s_{in}(1,n), \ldots, s_{in}(P,n)$, may bypass the conditioning units 260(1-P), or may de-activate the conditioning unit 260(1-P) from performing signal conditioning. In these embodiments, when input signals are determined to be uncorrelated (i.e., the correlation is below the correlation threshold), the adaptive impairment estimator 270 determines the impairment based on the input signals as captured prior to reaching the transmits paths, $s_c(1,m,n), \ldots, s_c(P,m,n)$, and based on the feedback signal $s_F(m,n)$. In some embodiments, the adaptive impairment estimator 270 is operative to perform the impairment estimation as described in U.S. Pat. No. 9,025,575B2, filed on Nov. 15, 2012, and/or U.S. Pat. No. 9,094,254B2, filed on May 15, 2013, which are incorporated herein by reference.

When the correlation between any pair of the input signals $s_{in}(1,n), \ldots, s_{in}(P,n)$ exceeds a predetermined threshold, the correlation detection unit 250 may activate one of the conditioning units 260(1-P) on the transmit paths to condition the input signals. In one embodiment, the conditioning unit 260(1-P) conditions the input signals before they enter the equalizers 290(1-P). The traffic signals may be conditioned by slight phase and/or amplitude variations as a function of time. There are different options for implementing the phase and/or amplitude variations applied by the conditioning units 260(1-P). In one embodiment, a low power replica is added to each input signal, or to the input signal that is found to be correlated with another traffic signal. One or more of the following can be applied to the low power replica: a) A small unique frequency offset is applied to some or all low power replicas as appropriate. b) A small unique delay offset is applied to some or all low power replicas as appropriate. c) A unique filter is applied to some or all low power replicas as appropriate. In some embodiments, each of the traffic signals $s_{in}(i,n)$ is multiplied (or dithered) by a phase value $d(i,m)$ at the conditioning unit 260-$i$, to enable the estimation of the impairment $h_d(i)$ caused in the transmit path 229-$i$, and where the index m is the data block (or equation) index. It is understood that the embodiments described herein are not so restricted and other phase and/or amplitude variations may be used.

The conditioning produces signals that have a large enough component that is statistically independent (i.e., uncorrelated or in other words where the correlation threshold between each pair of the conditioned signals is lower than the correlation threshold). In one example, the conditioning of a signal of transmit path 229-$i$ can result in the signal $s_R(i,n)$ as per the equation (1) below:

$$s_R(i,n) = \beta e^{j\gamma} \quad (1)$$

where $\beta = 2|s_{in}(i,n)| \sin(d(i,m)/2)$, and where $\gamma = \pi - (d(i,m)/2)$.

The output of each conditioning unit 260(1-P) is then input to an equalizer 290(1-P).

In some embodiments, when the conditioning is applied to the input signals $s_{in}(1,n), \ldots s_{in}(P,n)$, the conditioning and convolution with the equalizer function is also applied to the respective captured input signals $s_c(1,m,n), \ldots, s_c(P,m,n)$ to obtain the reference signals. In some embodiments, when the input signals are entirely correlated, only a single input signal is captured. In this case, the conditioning operations are performed on this single signal to generate the reference signals $s_c(1,m,n), \ldots, s_c(P,m,n)$ associated with the transmit paths.

In some embodiments, when the conditioning is applied to the input signals, $s_{in}(1,n), \ldots s_{in}(P,n)$, the feedback signal $s_F(m,n)$ received from the sub-arrays 221(1-P) is a combination of all the signals after they have traversed the different components of the transmitter (e.g., the conditioning units, the equalizers, the Tx Chains, the feeders, etc.). In particular the feedback signal can be described according to equation (2) below:

$$s_F(m,n) = n) = \Sigma_{i=1}^{P} \{s_{in}(i,n) e^{jd(i,m)} * h_{eq}(i) * h_d(i)\} \quad (2)$$

Where * is a time convolution, $h_{eq}(i)$ is the equalizer impulse response and $h_d(i)$ is the impairment that occurs in the Tx Chain "i".

The adaptive impairment estimator 270 aligns the feedback signal with the reference signals in time, and performs a de-convolution of the reference signals jointly with the feedback signal. The result of the de-convolution is an estimated impairment for each transmit path. As the effect of impairment is equivalent to convolving the reference signals with the impairment, the impairment may be calculated by de-convolving the reference signals with the impaired feedback signal.

Based on the estimated impairment from the adaptive impairment estimator 270, an equalizer synthesis unit 280 computes an approximate inverse to the impairment in the frequency range occupied by the outbound traffic signals. The equalizer synthesis unit 280 produces a set of equalizer taps representative of the approximate inverse to the impairment. The equalizer synthesis unit 280 determines and sets the tap values of the corresponding equalizers 290(1-P) according to the equalizer taps. In one embodiment, each one of the equalizers 290(1-P) is a complex finite impulse response (FIR) filter with one or more taps (i.e., equalizer taps). The finite impulse response is an approximate inverse to the impairment that occurs in the corresponding transmit path from a transmit chain 230 to the antenna port that couples the radio unit 210 to the antenna array 118. As such, each outbound traffic signal processed by one of the equalizer 290(1-P) is pre-distorted such that the pre-distortion cancels out the impairment in the transmit path.

Although FIG. 2 shows that the calibration functions are performed entirely in the radio unit 210, some or all of the calibration functions can be performed in the baseband unit 212 of the base station 110. In some embodiments, the calibration functions may be performed in the radio unit 210, the baseband unit 212, and/or other portions of the base station 110.

In one embodiment, the impairment estimation and equalization are performed in a continuous loop, where the feedback signal and input signals are continuously captured over time and are continuously used to refine the equalizer taps. The computation of impairment estimation and equalization can be performed offline or in real-time. For example, a block of input signals captured over a period of time may be used in offline processing in order to obtain an accurate impairment estimation and equalization. Alternatively, real-time processing may be more responsive to changes in operating conditions. In some embodiments, the base station 110 may dynamically switch between offline and real-time processing based on the current operating conditions.

In the embodiments, where the traffic signals transmitted through the antenna array are correlated, a small amount of phase dithering (performed at the conditioning units 260(1-P)) is applied to minimize the distortion of the traffic signals. However, if the phase dithering is small, the uncorrelated portions of the traffic signals created by the phase dithering is small compared to the correlated portion of the traffic signals and thus the signal-to-interference-plus-noise (SINR) ratio of the uncorrelated portions traffic signals used for transfer function estimation is low. With a low SINR, the amount of data blocks that need to be captured for each input signal and the number of equations that have to be solved for determining the impairment for each one of the transmit paths can be large causing the time needed to perform an accurate calibration to be significantly increased. Further, the increase of the number of sub-arrays and transmit paths within the base station may increase the complexity of the computation of the impairment rendering prior calibration approaches very inefficient.

The embodiments of the present invention present techniques for improving the calibration SINR, increasing the performance of the calibration, and for reducing the size of memory needed for storing captured input signals. In the embodiments discussed herein the correlated portions of the signals are subtracted from the feedback signal $s_F(m,n)$ in order to enable a more efficient calibration of an antenna array based on uncorrelated portions of the input signal.

The operations in the flow diagram of FIGS. 3A-B and 4B will be described with reference to the exemplary embodiments of FIGS. 1, 2, 4A, and 5. However, it should be understood that the operations of the flow diagrams can be performed by embodiments of the invention other than those discussed with reference to FIGS. 1, 2, 4A, and 5 and the embodiments of the invention discussed with reference to these other figures can perform operations different than those discussed with reference to the flow diagrams of FIGS. 3A-B and 4B.

Figure 3A:
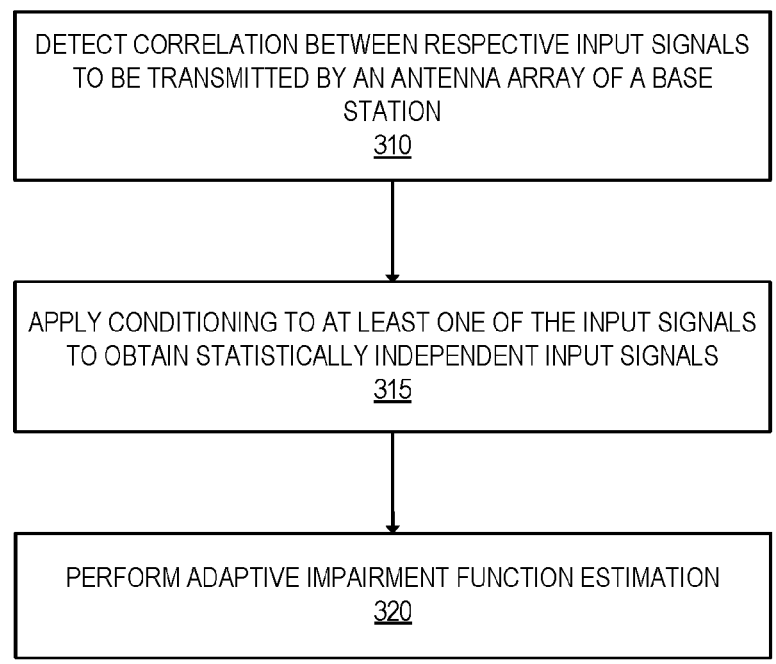
FIG. 3A illustrates a flow diagram of exemplary operations for performing an adaptive impairment estimation when a correlation is detected between input signals to be transmitted by an antenna array of a base station, in accordance with some embodiments.
Figure 3B:
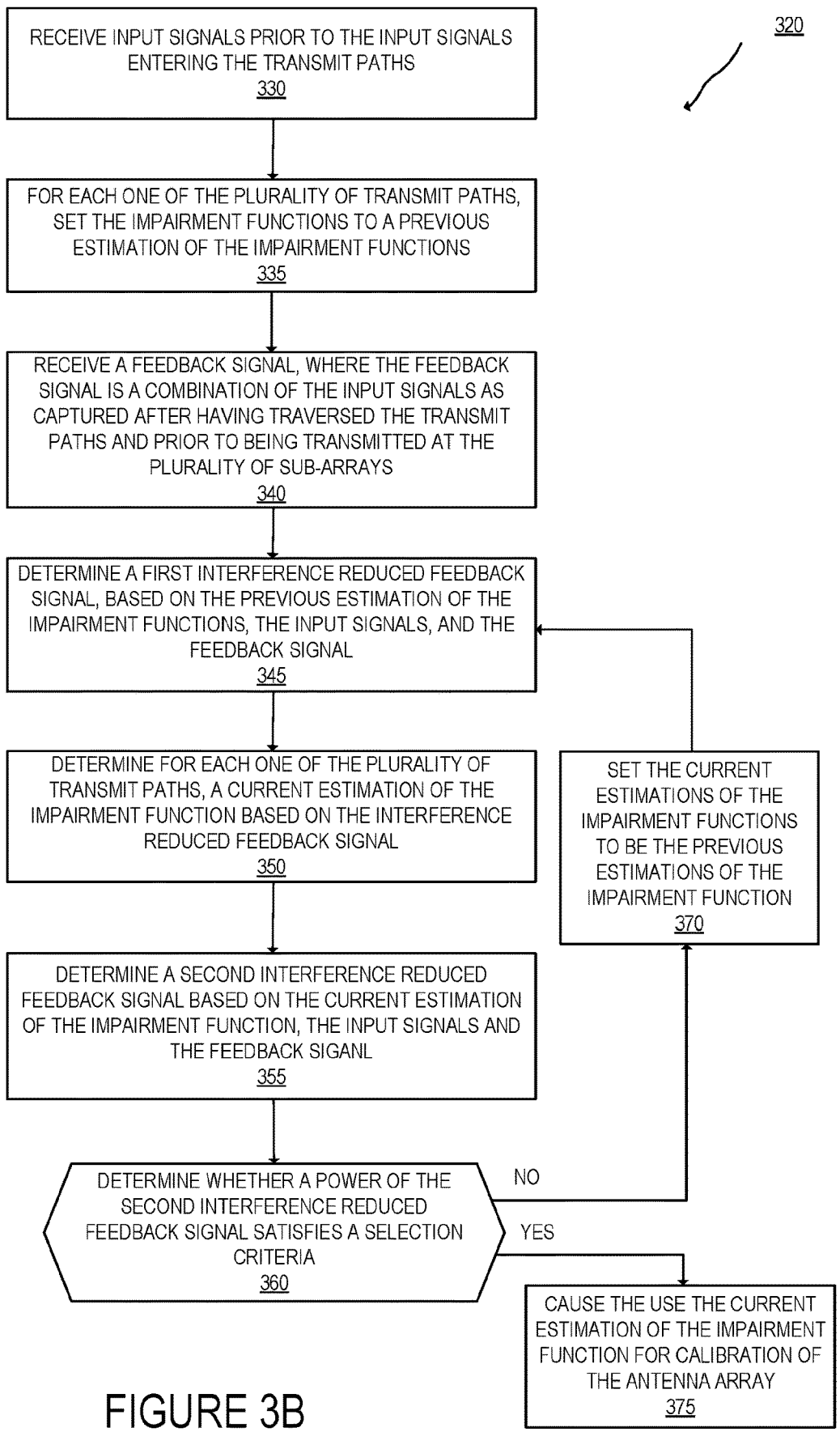
FIG. 3B illustrates a flow diagram of exemplary operations for performing an adaptive estimation of the impairment functions that are incurred in transmit paths of the base station in accordance with some embodiments.

FIG. 3A illustrates a flow diagram of exemplary operations for performing an adaptive impairment estimation when a correlation is detected between input signals to be transmitted by an antenna array of a base station, in accordance with some embodiments. At operation 310, a detection of correlation between respective input signals to be transmitted by an antenna array of a base station is performed. In some embodiments, the detection of correlation is performed at the correlation detection unit 250. The correlation detection may be performed by a cross-correlation computation between each of the input signals $s_{in}(1,n), \ldots, s_{in}(P,n)$ and all of the other input signals. In some embodiments, the correlation detection unit 250 may be part of the adaptive impairment estimator 270 and the operation of correlation detection is performed on the captured input signals $s_c(1,m,n), \ldots, s_c(P,m,n)$.

When the correlation between any pair of the input signals $s_{in}(1,n), \ldots, s_{in}(P,n)$ exceeds a predetermined correlation threshold, the correlation detection unit 250 may activate at least one of the conditioning units 260(1-P) on the transmit paths to condition the input signals. In one embodiment, the conditioning unit 260(1-P) conditions the input signals before they enter the equalizers 290(1-P). At operation 315, the conditioning is applied to at least one of the input signals to obtain statistically independent conditioned input signals. The traffic signals may be conditioned by slight phase and/or amplitude variations as a function of time. This phase variation can be made such that it can be removed by user equipment as part of normal channel estimation processing and therefore has no impact to system throughput. In some embodiments, the conditioning is performed as described above with reference to FIG. 2.

In some embodiments, when the correlation between pairs of the input signals $s_{in}(1,n), \ldots, s_{in}(P,n)$ exceeds the predetermined threshold, the correlation detection unit 250 may cause the base station to inject special calibration signals within the traffic signals to be used during the calibration process instead of conditioning the traffic signals to include the phase and/or amplitude variations. In these embodiments, the special calibration signals are injected such that the interruption of the traffic signals is minimized. In the following description, the operations of calibration of the antenna array can be performed based on input signals that include traffic signals only (a combination of correlated traffic signal with dithered traffic signals) or alternatively by input signals that include a combination of correlated traffic signals and injected special calibration signals. In all embodiments described below, the input signals received at the radio unit and which are to be transmitted through the sub-arrays of the antenna array are modified to include correlated and uncorrelated signals following a determination that a correlation between the different input signals exceeds a predetermined correlation threshold.

The flow of operations then moves to operation 320, at which the adaptive estimation of the impairment functions is performed. FIG. 3B illustrates a flow diagram of exemplary operations 320 for performing an adaptive estimation of the impairment functions $h_d(i)$ (for $i=\{1, \ldots, P\}$) that are incurred in the transmit paths 229(1-P) of the base station 110 in accordance with some embodiments. In some embodiments, the operations of the flow diagram of FIG. 3B are performed by the adaptive impairment estimator 270 of the base station 210. In other embodiments, some operations may be performed outside the adaptive impairment estimator 270 without departing from the scope of the present invention.

At operation 330, the input signals are received prior to entering the transmit paths. For example, the input signals are received as captured input signals $s_c(1,m,n), \ldots, s_c(P,m,n)$. The captured input signals are captured at capture points and have not been impaired by the components in the transmit paths. The captured signals are suitable for determining reference signals for performing the calibration. At operation 335, for each one of the transmit paths, an impairment function is set to a previous estimation of the impairment function. The previous estimation of the impairment function is a value of the impairment function that was determined for each path at a previous occurrence of the calibration process. When the system is initialized, the previous estimation of the impairment functions have not been determined yet and an initial estimation of the impairment function may be performed at operation 335. In some embodiments, the initial estimation may be performed according to the operations of FIG. 4. In this embodiment, during an initial phase, the impairment function estimation is performed for each path independently without the use of the combined feedback signal. For example, the impairment function estimation is performed by injecting the input signals $s_{in}(i,n)$ into the base station one at a time in order to determine the impairment function associated with each transmit path 290-$i$ independently of the other transmit paths.

Figure 4A:
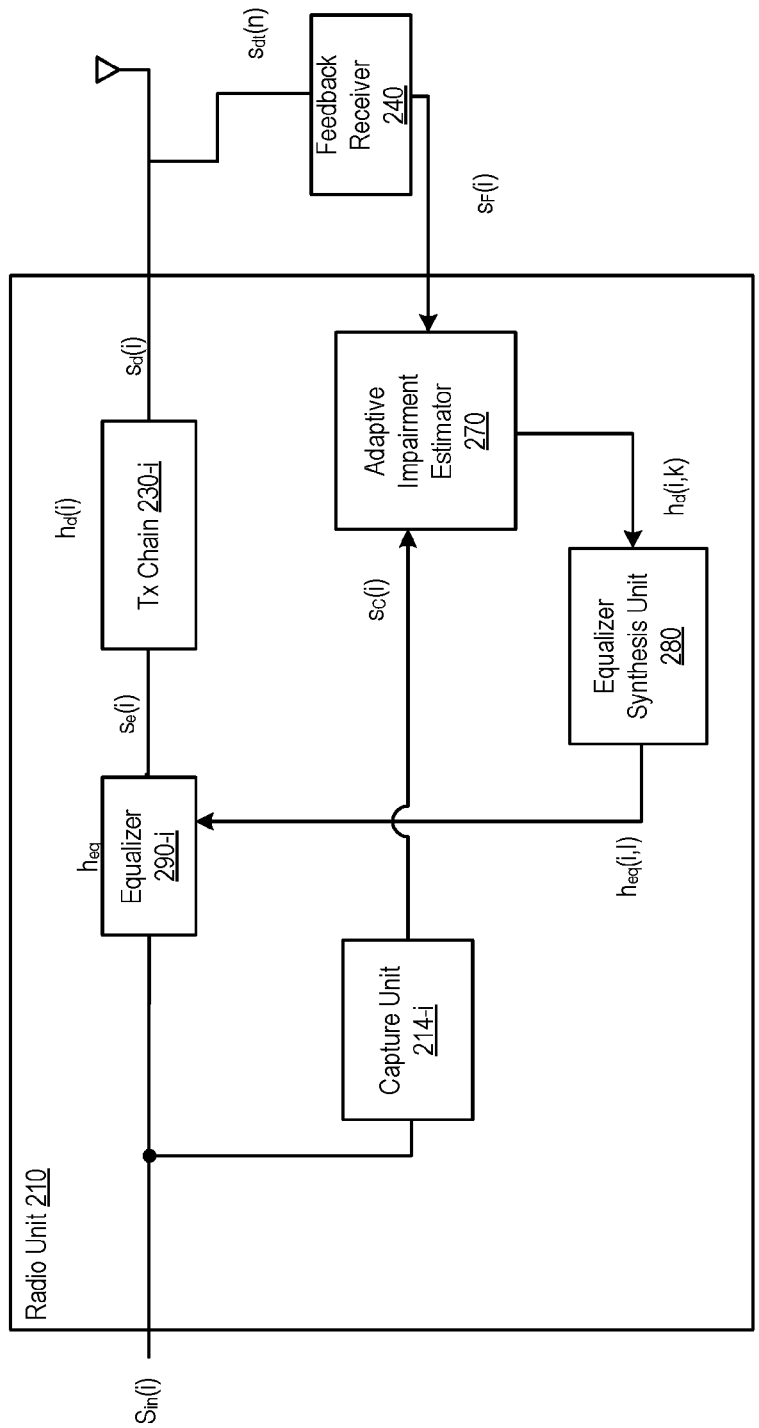
FIG. 4A illustrates a block diagram of an exemplary impairment function computation in a single transmit path of a radio unit in accordance with some embodiments.
Figure 4B:
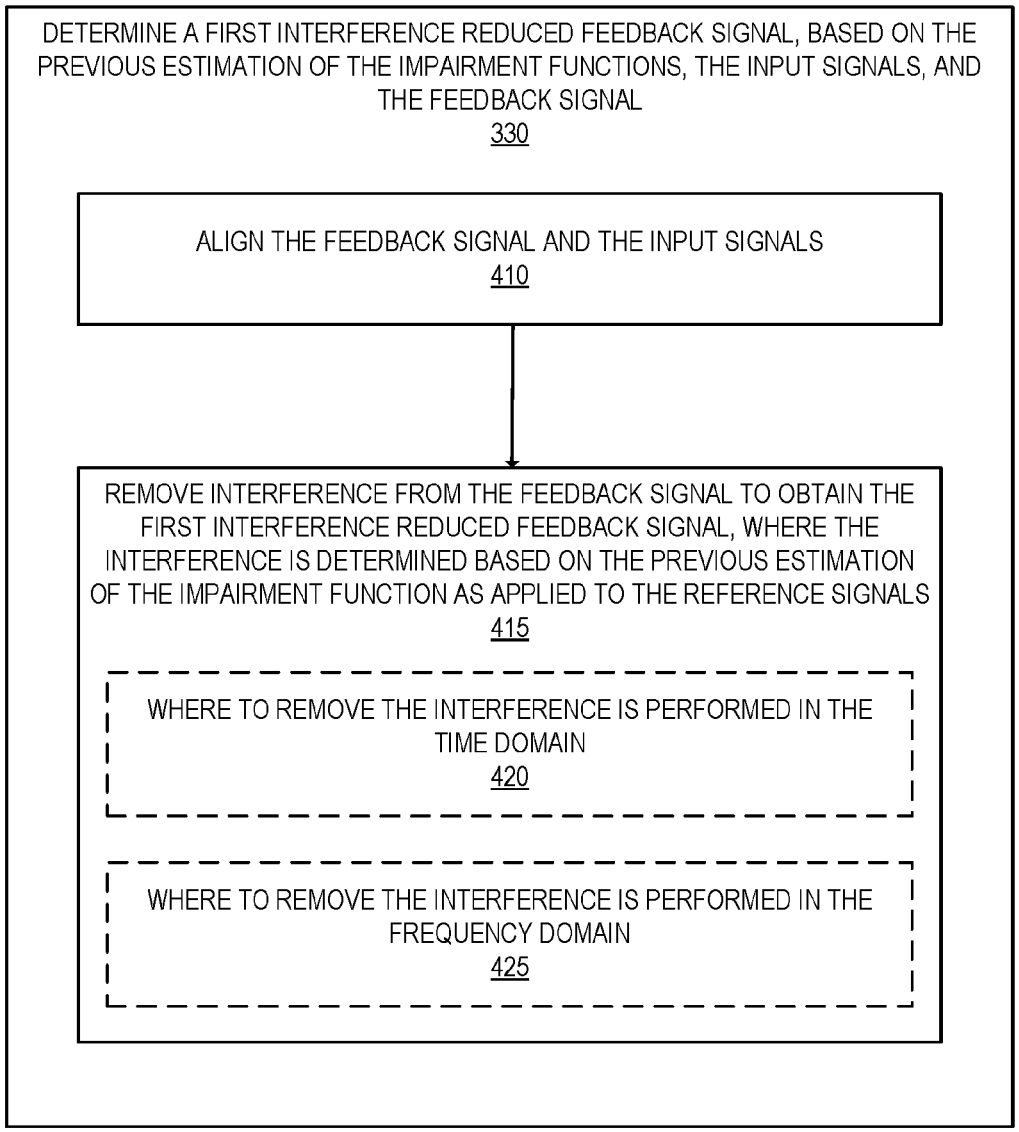
FIG. 4B illustrates a flow diagram of exemplary operations for determining the first interference reduced feedback signal, in accordance with some embodiments.

FIG. 4A illustrates a block diagram of an exemplary impairment function computation in a single transmit path of a radio unit according to one embodiment. FIG. 4 illustrates a single path within the radio unit 210 that is used for transmitting an input signal $s_{in}(i)$ towards a wireless network and through a sub-array of the antenna array 118. During the initial operation, the conditioning unit is skipped (not illustrated in FIG. 4) as a single signal is input and there is no other signal in the base station that may be correlated to the input signal. The adaptive impairment estimator 270 is operative to receive the feedback signal $s_F(i)$, the captured input signal $s_c(i)$ and to determine an estimation of the impairment function $h_d(i)$ that occurs in the transmit path. The feedback signal can be written as: $s_F(i)=s_e(i)*h_d(i)+$ (30), where * is the convolution operation, and $s_e(i)$ is the equalized input signal. In this initial estimation operation, the equalizer does not alter the input signal and the equalized input signal $s_e(i)$ is substantially identical to the captured input signal $s_c(i)$ received by the adaptive impairment estimator.

Thus, the estimated impairment function can be found as: $h_d(i,k)=[s_F(i)]^{*-1}(i)$, where $*^{-1}$ is the de-convolution. This de-convolution can be solved directly by division in the frequency domain or by iterative de-convolution algorithms such as the iterative least mean squares (LMS). Computation of the de-convolution may be performed by a general-purpose processor executing de-convolution, a special-purpose hardware device (e.g., an Application-Specific Integrated Circuit (ASIC)), firmware, or a combination of the above. The estimated impairment $h_d(i,k)$ is used as an initial impairment function estimation for the transmit path 229-$i$. This process is performed for all the transmit paths of the radio unit 210 independently to obtain a set of initial impairment function estimations. These initial impairment function estimations are used as previous estimations of the impairment functions at operation 335 when the calibration process is first initiated.

Referring back to FIG. 3, the flow of operations moves from operation 335 to operation 340. At operation 340, the adaptive impairment estimator 270 receives a feedback signal. The feedback signal (e.g., feedback signal $s_F(m,n)$) is a combination of the input signals as captured after having traversed the transmit paths and prior to being transmitted at the plurality of sub-arrays. In particular the feedback signal can be described according to equation (2) below:

$$s_F(m,n)=\Sigma_{i=1}^{P}\{s_{in}(i,n)e^{jd(i,m)}*h_{eq}(i)*h_d(i)\} \quad (2)$$

Where * is a time convolution, $h_{eq}(i)$ is the equalizer impulse response and $h_d(i)$ is the impairment that occurs in the Tx Chain 230-$i$.

The flow then moves to operation 345, at which the adaptive impairment estimator 270 determines a first interference reduced feedback signal based on the previous estimation of the impairment function for each one of the transmit paths, the input signals and the feedback signal. FIG. 4B illustrates a flow diagram of exemplary operations for determining the first interference reduced feedback signal, in accordance with some embodiments.

At operation 410, the adaptive impairment estimator 270 aligns the feedback signal $s_F(m,n)$ with the input signals as captured prior to traversing the transmit paths $s_c(1,m,n), \ldots, s_c(P,m,n)$. In some embodiments, the input signals can be aligned with one another in a separate operation, and the feedback signal is then aligned with one of the captured input signal. For example, the alignment of the input signals can be performed by implementing an early-late correlator, which includes a first-in-first-out (FIFO) buffer. The timing among the input signals can be adjusted by adjusting the FIFO length. The time alignment only needs to be done once on the input signals. In some embodiments, the alignment of the input signals is performed during carrier setup to fall within a baseband sample time. Finer timing adjustment can be performed by the equalizers 290. Additionally, the feedback signals are aligned with the transmit signals; for example, to a fractional delay of at least a quarter of the baseband sample time. In one embodiment, the feedback signal only needs to be aligned with one transmit signal after the transmit signals are aligned in time.

Flow moves to operation 415, at which the adaptive impairment estimator 270 removes the interference from the feedback signal to obtain the first interference reduced feedback signal. The interference signal includes correlation traffic signal that forms a portion of the feedback signal. In one embodiment, the interference signal, is subtracted from the feedback signal in the time domain (operation 420) in accordance with equation (4) below:

$$s_F'(m,n)=s_F(m,n)-\Sigma_{i=1}^{P}\{s_c(i,n)*h_{eq}(i)*h_d(i)\} \quad (4)$$

In another embodiment, the interference signal is subtracted from the feedback signal in the frequency domain (operation 425). In this embodiment, the feedback signal is a continuous signal, and a time-domain window is applied on the feedback signal. The window applied on the feedback signal can be a Hamming raised cosine window or another similar window. A Hamming raised cosine window is: $f_w(n)=0.54-0.46 \cos(2\pi n/(N-1))$, for $n=1, 2, \ldots N$.

An N point fast fourier transform (FFT) is then applied to the feedback signal $s_F(m,n)$ to obtain a representation of the feedback signal in the frequency domain. The feedback signal is represented as $s_F(m,n)$ and the captured input signals are represented as $S_c(i,m,k)$. The notation m is a data block index with $m=1, 2, \ldots, M$, where M is the number of data blocks collected for the purpose of calibration. Each data block has N data samples. For example, if $N=128$ and $M=20$, then twenty 128-point FFTs are performed on the time-domain data samples, and the resulting frequency domain data can be used to calculate the interference reduced feedback signal in the frequency domain.

The interference can then be removed in the frequency domain in accordance with equation (5) below:

$$S_F'(m,n)=S_F(m,k)-\Sigma_{i=1}^{P}\{S_c(i,m,k)*H_{eq}(i,k)*H_d(i,k)\} \quad (5)$$

Where $S_c(i,m,k)$ is an FFT of the windowed input signal $s_c(i,m,n)$, $H_{eq}(i, k)$ is the equalizer impulse response in the frequency domain, and $H_d(i,k)$ is the impairment function in the frequency domain.

The interference reduced feedback signal is a feedback signal from which estimations of impaired correlated signals (i.e., $\Sigma\{S_c(i,m,k) H_{eq}(i, k) H_d(i,k)\}$) are subtracted resulting in a feedback signal comprising impaired uncorrelated signals. In equation (5), $S_c(i,m,k)$ is a representation of the captured input signals in the frequency domain. The frequency components of this input signal are thus known. $H_{eq}(i, k)$ is also know. In some embodiments, the $H_{eq}(i, k)$ may not be applied. In other embodiments, the $H_{eq}(i, k)$ may have been determined to inverse the effect of the previous estimation of the impairment function of a transmit path. $H_d(i,k)$ is the unknown impairment function. In order to determine the interference reduced feedback signal, the adaptive impairment estimator 270 uses the value of the impairment function set at operation 335 (i.e., the previous estimation of the impairment function) to calculate and determine the interference reduced feedback signal $S_F'(m, n)$.

Referring back to FIG. 3B, the flow then moves to operation 350, at which for each one of the transmit paths, a current estimation of the impairment function is performed based on the interference reduced feedback signal. In some embodiments, the determination of the current estimation of the impairment functions is performed according to operations of FIG. 5.

Figure 5:
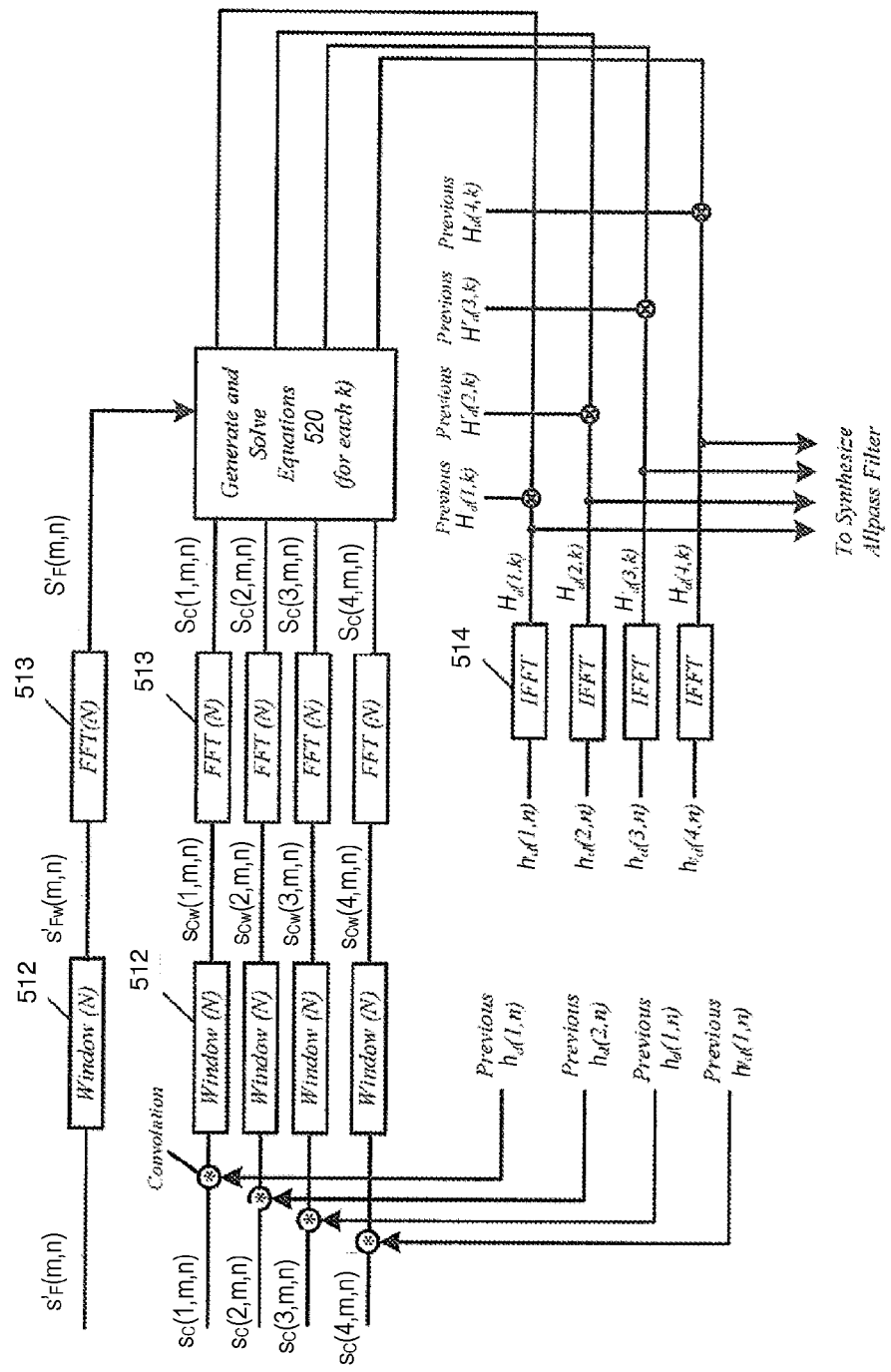
FIG. 5 is a block diagram illustrating an example of the determination of the current estimation of the impairment function based on interference reduced feedback signal, in accordance with some embodiments.

FIG. 5 is a block diagram illustrating an example of the determination of the current estimation of the impairment function based on interference reduced feedback signal, according to one embodiment. While the example of FIG. 5 illustrates four input signals (representing signals of four transmit paths within a radio unit), this is intended to be exemplary only. The embodiments of the present invention can be used to perform calibration and estimation of the impairment function in antenna array with any number of transmit path and corresponding sub-arrays.

The captured input signals are convolved with the previous estimations of the impairment functions. A window 512 (e.g., a Hamming raised cosine window) is applied to each of the captured input signals and the interference reduced feedback signal. An N-point FFT 513 is then applied to the captured input signals and the interference reduced feedback signal to obtain a frequency domain representation. The frequency domain signals are used to perform joint deconvolution by a Generate and Solve Equations block 520 which will be described below.

In the example of FIG. 5, the interference reduced feedback signal is represented as $s_F'(m,n)$ and the captured input signals are represented as $s_c(i,m,k)$. The Generate and Solve Equation block 520 generates an over-determined system of linear equations and solves for an impairment vector (which includes P impairment values) for each frequency bin k. The linear equation for each frequency bin k, data block index m and P=4 can be written as follows:

$S_c(1,m,k) H_d(1,k)+S_c(2,m,k) H_d(2,k)+S_c(2,m,k) H_d(2,k)+S_c(3,m,k) H_d(3,k)+S_c(4,m,k) H_d(4,k)=S'_F(m,k)$ The number of data blocks M determines the number of linear equations. The value M can be any integer number greater than P; for example, M=20.

This linear equation has four unknown coefficients $H_d(i,k)$ for the P transmit paths (that is, one impairment value for each transmit path). In order to solve for $H_d(i,k)$, four or more independent equations are needed. This can be achieved by using different data blocks with index m= {1, 2, . . . , M}. The equations in matrix form for each frequency bin k is as follows:

$$S_c(k)H_d(k) = S'_F(k)$$

where $$S_c(k) = \begin{bmatrix} S_c(1,1,k) & \cdots & S_c(4,1,k) \\ S_c(1,2,k) & & S_c(4,2,k) \\ \vdots & \ddots & \vdots \\ S_c(1,M,k) & \cdots & S_c(4,M,k) \end{bmatrix}$$

$$H_d(k) = \begin{bmatrix} H_d(1,k) \\ H_d(2,k) \\ \vdots \\ H_d(4,k) \end{bmatrix}$$

$$S'_F(k) = \begin{bmatrix} S'_F(1,k) \\ S'_F(2,k) \\ \vdots \\ S'_F(4,k) \end{bmatrix}$$

The estimated impairment vector for each frequency bin k is then, $H_d(k)=S^+(k)S'_F(k)$ where $S^+=[S_c^H(k)S_c(k)]^{-1}S_c^H(k)$ is the pseudo inverse of $S_c$ and H is the Hermitian (conjugate transpose).

Referring back to FIG. 3B, once the current estimations of the impairment functions are determined for each transmit path and based on the interference reduced feedback signal, the flow moves to operation 355. At operation 355, the adaptive impairment estimator 270 determines a second interference reduced feedback signal based on the current estimation of the impairment function for each one of the transmit paths, the input signals and the feedback signal. The current estimations of the impairment functions represent an updated estimation of the impairment functions that the captured input signals incurred in the transmit paths. Over time the impairment function that occurs in a transmit path may change (e.g., due to temperature changes, or other parameters). These updated estimations are typically a better estimation of the impairment functions than the previous estimations of the impairment functions. At operation 355, the current estimations are used to determine an updated (i.e., the second) interference reduced feedback signal. The updated interference reduced feedback signal S"F(m,n) is determined according to equation (5) above:

$$S_F''(m,n)=S_F(m,k)-\Sigma_{i=1}^P\{S_c(i,m,k)H_{eq}(i,k)H_d(i,k)\} \quad (5)$$

Where $H_d(i,k)$ are set to the current estimations of the impairment functions for i=1 to P. The use of the current estimations of the impairment functions to determine the updated interference reduced feedback signal enable the cancellation of more correlated portions of the input signals.

Flow moves to operation 360, at which the adaptive impairment estimator 270 determines whether a power of the second interference reduced feedback signal satisfies a selection criteria. In one embodiment, determining that the power of the second interference reduced feedback signal satisfies the selection criteria includes determining that the power of the second interference reduced feedback signal is smaller than a predetermined threshold. In another embodiment, determining that the power of the second interference reduced feedback signal satisfies the selection criteria includes determining that a change in power of the second interference reduced feedback signal is smaller than a predetermined threshold.

Upon determining that the power of the second interference reduced feedback signal does not satisfy the selection criteria, flow moves to operation 370, at which the adaptive impairment estimator 270 sets, for each transmit path, the current estimation of the impairment function to be the previous estimation of the impairment function and repeats operations 330, 345, 350, 355 and 360 until an updated second interference reduced feedback signal is determined to satisfy the selection criteria (e.g., until the power of the updated interference reduced feedback signal is smaller than a predetermined correlation threshold or a change in power of the second interference reduced feedback signal is smaller than a predetermined threshold).

Upon determining that the power of the second interference reduced feedback signal satisfies the selection criteria, flow moves to operation 375, at which the adaptive impairment estimator 270 causes the use of the current estimations of the impairment functions for completing the calibration of the antenna array of the base station and removing distortion. The adaptive impairment estimator 270 transmits the current estimations of the impairment functions (e.g., $h_d(1,k)$ . . . $h_d(P,k)$ as illustrated in FIG. 2) to the equalizer synthesis unit 280.

In one embodiment, the equalizer synthesis unit 280 determines, for each of the transmit paths, a set of taps. The frequency response of the set of taps matches a frequency response of the current estimation of the impairment function. The equalizer synthesis unit 280 further performs an inversion of the set of taps to obtain equalizer taps for each of the transmit paths. In some embodiments, the set of taps are taps of an all-pass filter, where the all-pass filter has a frequency response that approximates the current impairment estimation in an occupied frequency region where signal power of the input signals is above a threshold.

In another embodiment, the equalizer synthesis unit 280 synthetization, for each of the transmit paths, of a set of equalizer taps that has a frequency response that approximates an inverse of the current estimation of the impairment function in an occupied frequency region where the signal power of the input signals is above a threshold.

The equalizer taps (e.g., $h_{eq}(1,1)$ . . . $h_{eq}(P,Q)$ of FIG. 2) are applied to the input signals at the equalizers 290(1-P) before the input signals enter the transmit paths to remove the distortion incurred by the transmit paths consequently performing calibration of the antenna array.

The embodiments of the present invention described herein enable calibration techniques that have several advantages when compared with existing calibration techniques. In particular, the use of interference reduced feedback signal enable shorter signal capture times and fewer averages calculation for solving the impairment function equations and obtaining a given calibration accuracy when there is significant correlation between traffic signals. This enables faster calibration update rates in the cases where significant correlation exist between traffic signals.

In some embodiments, the calibration techniques do not use any special calibration signal injected into the base station. This allows a base station to be in full compliance with applicable standards. As normal outbound traffic signals are used for calibration, the calibration does not interrupt or interfere with the ongoing traffic signals, and therefore does not impact system availability and signal quality. In addition, as the calibration does not incur interruption of normal system operation, the calibration can be performed at all times to account for changes in operating conditions such as temperature changes. In other embodiments, the calibration technique may use special calibration signals injected into the base station in addition to outbound traffic signals.

In one embodiment, the calibration can be performed entirely within the radio unit of a base station using an interference reduced feedback signal from an antenna, without involving other parts of the base station and the network. Confining the calibration within the radio unit can simplify the hardware and software design and lower the cost of the system. Moreover, the radio unit in a base station is typically multi-standard, which also means that the radio unit is agnostic to the specific radio standard (i.e., 5th generation wireless systems (5G), 4th generation wireless systems (4G), Long Term Evolution (LTE), Global System for Mobile Communications (GSM), Code Division Multiple Access (CDMA), Wideband CDMA (WCDMA), etc.) being implemented by the base station. Therefore, performing the calibration in the radio unit maintains the multi-standard characteristic of the base station. It is to be appreciated that embodiments of the invention are not so limited; in some embodiments, the calibration can be performed by the radio unit and other parts of the base station, e.g., the baseband unit. However, the digital circuitry in the baseband unit is generally multi-standard in hardware, but typically uses unique software and configuration specific to each radio standard. Moreover, performing the calibration in the radio unit and the baseband unit may incur additional interconnects and coordination between these two units. Therefore, performing the calibration in the baseband unit or multiple units of the base station may be more costly than performing the calibration entirely in the radio unit. The calibration technique described herein may be implemented in both time-division duplex (TDD) and frequency-division duplex (FDD) systems.

The calibration techniques described herein are flexible and can be used under a large range of system conditions, such as wide bandwidth, multiple carriers and multiple technologies. The calibration techniques significantly improve system performance even with low signal-to-noise ratio in the feedback signal. The calibration techniques can automatically handle large relative delay differences between the transmit paths. In addition, the calibration techniques can automatically handle a system with ill-conditioned (i.e., correlated) transmit signals. Thus, it is not necessary to coordinate the calibration with any other parts of the RBS or network activities.

Figure 6:
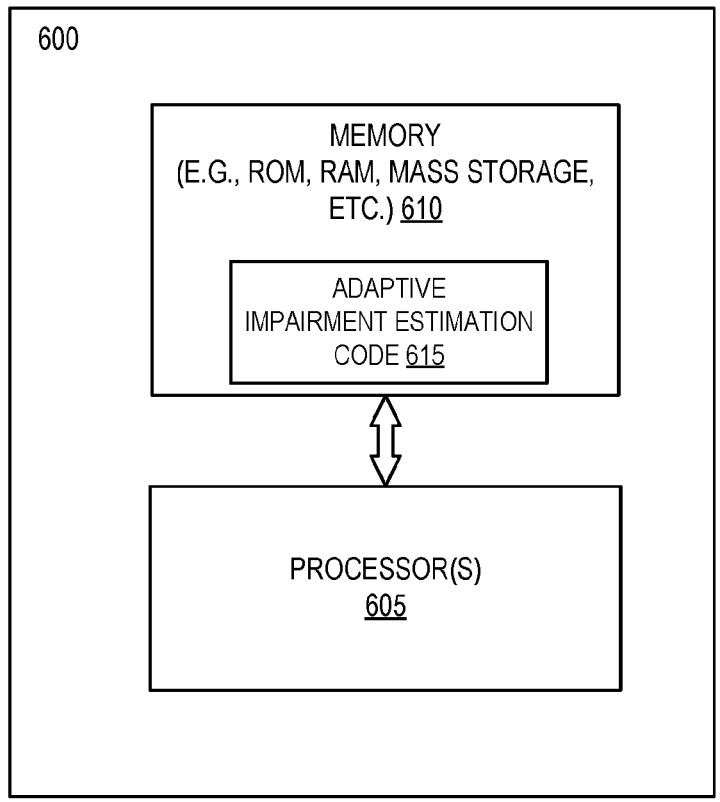
FIG. 6 illustrates a block diagram of an exemplary electronic device in accordance with some embodiments.

Architecture:

FIG. 6 illustrates a block diagram of an exemplary electronic device in accordance with some embodiments. An electronic device 600 stores and transmits (internally and/or with other electronic devices over a network) code (which is composed of software instructions and which is sometimes referred to as computer program code or a computer program) and/or data using machine-readable media (also called computer-readable media), such as machine-readable storage media 610 (e.g., magnetic disks, optical disks, read only memory (ROM), flash memory devices, phase change memory) and machine-readable transmission media (also called a carrier) (e.g., electrical, optical, radio, acoustical or other form of propagated signals such as carrier waves, infrared signals). Thus, an electronic device (e.g., a computer) includes hardware and software, such as a set of one or more processors 605 coupled to one or more machine-readable storage media 610 to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware. For example, the electronic device 600 includes adaptive impairment estimation code 615 stored in memory 610 which when executed by the processor 605 causes the processor to perform the operations described with reference to FIGS. 1-5 for enabling calibration of antenna array of a base station. The electronic device 600 may be part of the base station, for example part of the transmitter 114 and/or in communication with the different components of the transmitter 114.

As used herein, a network node (e.g., a router, switch, bridge, controller, base station) is a piece of networking equipment, including hardware and software, that communicatively interconnects other equipment on the network (e.g., other network nodes, user equipment, etc.). Some network nodes are "multiple services network nodes" that provide support for multiple networking functions (e.g., routing, bridging, switching, Layer 2 aggregation, session border control, Quality of Service, and/or subscriber management), and/or provide support for multiple application services (e.g., data, voice, and video).

While the invention has been described in terms of several embodiments, those skilled in the art will recognize that the invention is not limited to the embodiments described; it can be practiced with modification and alteration within the scope of the appended claims. The description is thus to be regarded as illustrative instead of limiting.

What is claimed is:

1. A method of calibrating an antenna array of a base station to remove distortion incurred by input signals within a plurality of transmit paths in the base station, the antenna array including a plurality of sub-arrays, wherein each one of the plurality of sub-arrays is coupled to a respective one from the plurality of transmit paths for transmitting an input signal from the input signals to a wireless network, the method comprising the steps of:
   (a) receiving the input signals prior to the input signals entering the transmit paths;
   (b) for each one of the plurality of transmit paths, setting an impairment function to a previous estimation of the impairment function;
   (c) receiving a feedback signal, wherein the feedback signal is a combination of the input signals as captured after having traversed the transmit paths and prior to being transmitted at the plurality of sub-arrays;

(d) determining a first interference reduced feedback signal based on the previous estimation of the impairment function for each one of the plurality of transmit paths, the input signals and the feedback signal;

(e) determining for each one of the plurality of transmit paths, a current estimation of the impairment function based on the interference reduced feedback signal;

(f) determining a second interference reduced feedback signal based on the current estimation of the impairment function for each one of the plurality of transmit paths, the input signals and the feedback signal;

(g) determining whether a power of the second interference reduced feedback signal satisfies a selection criteria; and (h) responsive to determining that the power of the second interference reduced feedback signal satisfies the selection criteria, causing the use of the current estimation of the impairment function for each one of the plurality of transmit paths for calibration of the antenna array of the base station and removing distortion.

2. The method of claim 1 further comprising:

(i) responsive to determining that the power of the second interference reduced feedback signal does not satisfy the selection criteria, setting the current estimation of the impairment function to be the previous estimation of the impairment function; and (j) repeating (d) to (j) until the power of the second interference reduced feedback signal satisfies the selection criteria.

3. The method of claim 1, wherein determining that the power of the second interference reduced feedback signal satisfies the selection criteria includes determining that the power of the second interference reduced feedback signal is smaller than a predetermined threshold.

4. The method of claim 1, wherein determining that the power of the second interference reduced feedback signal satisfies the selection criteria includes determining that a change in power of the second interference reduced feedback signal is smaller than a predetermined threshold.

5. The method of claim 1, wherein determining a first interference reduced feedback signal includes:

aligning the feedback signal and the input signals; and removing interference from the feedback signal to obtain the first interference reduced feedback signal, wherein the interference is determined based on the previous estimation of the impairment functions as applied to the input signals.

6. The method of claim 5, wherein to remove the interference is performed in at least one of a time domain and a frequency domain.

7. The method of claim 1, wherein causing the use of the current estimation of the impairment function for each one of the plurality of transmit paths for calibration of the antenna array includes:

causing a determination, for each of the transmit paths, of a set of weights of an all-pass filter, wherein the all-pass filter has a frequency response that approximates the current estimation of the impairment function in an occupied frequency region, where signal power of the input signals is above a threshold; and causing the set of weights to be inversed to obtain equalizer taps for each of the transmit paths.

8. The method of claim 1, wherein causing the use of the current estimation of the impairment function for each one of the plurality of transmit paths for calibration of the antenna array includes:

causing a synthetization, for each of the transmit paths, of a set of equalizer taps that has a frequency response that approximates an inverse of the current estimation of the impairment function in an occupied frequency region where the signal power of the input signals is above a threshold.

9. The method of claim 7, wherein the method further comprises causing the equalizer taps to be applied to the input signals before the input signals enter the transmit paths to remove the distortion incurred by the transmit paths.

10. A network element for calibrating an antenna array of a base station to remove distortion incurred by input signals within a plurality of transmit paths in the base station, the antenna array including a plurality of sub-arrays, wherein each one of the plurality of sub-arrays is coupled to a respective one from the plurality of transmit paths for transmitting an input signal from the input signals to a wireless network, the network element comprising:

a non-transitory computer readable storage medium to store instructions; and a processor coupled with the non-transitory computer readable storage medium to process the stored instructions to:

(a) receive the input signals prior to the input signals entering the transmit paths;

(b) for each one of the plurality of transmit paths, set an impairment function to a previous estimation of the impairment function;

(c) receive a feedback signal, wherein the feedback signal is a combination of the input signals as captured after having traversed the transmit paths and prior to being transmitted at the plurality of sub-arrays;

(d) determine a first interference reduced feedback signal based on the previous estimation of the impairment function for each one of the plurality of transmit paths, the input signals and the feedback signal;

(e) determine for each one of the plurality of transmit paths, a current estimation of the impairment function based on the interference reduced feedback signal;

(f) determine a second interference reduced feedback signal based on the current estimation of the impairment function for each one of the plurality of transmit paths, the input signals and the feedback signal;

(g) determine whether a power of the second interference reduced feedback signal satisfies a selection criteria; and (h) responsive to determining that the power of the second interference reduced feedback signal satisfies the selection criteria, cause the use of the current estimation of the impairment function for each one of the plurality of transmit paths for calibration of the antenna array of the base station and removing distortion.

11. The network element of claim 10, wherein the processor is further to:

(i) responsive to determining that the power of the second interference reduced feedback signal does not satisfy the selection criteria, set the current estimation of the impairment function to be the previous estimation of the impairment function; and (j) repeat (d) to (j) until the power of the second interference reduced feedback signal satisfies the selection criteria.

12. The network element of claim 10, wherein to determine that the power of the second interference reduced feedback signal satisfies the selection criteria includes to determine that the power of the second interference reduced feedback signal is smaller than a predetermined threshold.

13. The network element of claim 10, wherein to determine that the power of the second interference reduced feedback signal satisfies the selection criteria includes to determine that a change in power of the second interference reduced feedback signal is smaller than a predetermined threshold.

14. The network element of claim 10, wherein to determine a first interference reduced feedback signal includes to:
align the feedback signal and the input signals; and
remove interference from the feedback signal to obtain the first interference reduced feedback signal, wherein the interference is determined based on the previous estimation of the impairment functions as applied to the input signals.

15. The network element of claim 14, wherein to remove the interference is performed in at least one of a time domain and a frequency domain.

16. The network element of claim 10, wherein to cause the use of the current estimation of the impairment function for each one of the plurality of transmit paths for calibration of the antenna array includes:
to cause a determination, for each of the transmit paths, of a set of weights of an all-pass filter, wherein the all-pass filter has a frequency response that approximates the current estimation of the impairment function in an occupied frequency region, where signal power of the input signals is above a threshold; and
to cause the set of weights to be inversed to obtain equalizer taps for each of the transmit paths.

17. The network element of claim 10, wherein to cause the use of the current estimation of the impairment function for each one of the plurality of transmit paths for calibration of the antenna array includes:
to cause a synthetization, for each of the transmit paths, of a set of equalizer taps that has a frequency response that approximates an inverse of the current estimation of the impairment function in an occupied frequency region where the signal power of the input signals is above a threshold.

18. The network element of claim 16, wherein the processor is further to cause the equalizer taps to be applied the input signals before the input signals enter the transmit paths to remove the distortion incurred by the transmit paths.

19. A non-transitory computer readable storage medium that provide instructions, which when executed by a processor of a base station, cause said processor to calibrate an antenna array of a base station to remove distortion incurred by input signals within a plurality of transmit paths in the base station, the antenna array including a plurality of sub-arrays, wherein each one of the plurality of sub-arrays is coupled to a respective one from the plurality of transmit paths for transmitting an input signal from the input signals to a wireless network, by performing operations comprising:
(a) receiving the input signals prior to the input signals entering the transmit paths;
(b) for each one of the plurality of transmit paths, setting an impairment function to a previous estimation of the impairment function;
(c) receiving a feedback signal, wherein the feedback signal is a combination of the input signals as captured after having traversed the transmit paths and prior to being transmitted at the plurality of sub-arrays;
(d) determining a first interference reduced feedback signal based on the previous estimation of the impairment function for each one of the plurality of transmit paths, the input signals and the feedback signal;
(e) determining for each one of the plurality of transmit paths, a current estimation of the impairment function based on the interference reduced feedback signal;
(f) determining a second interference reduced feedback signal based on the current estimation of the impairment function for each one of the plurality of transmit paths, the input signals and the feedback signal;
(g) determining whether a power of the second interference reduced feedback signal satisfies a selection criteria; and
(h) responsive to determining that the power of the second interference reduced feedback signal satisfies the selection criteria, causing the use of the current estimation of the impairment function for each one of the plurality of transmit paths for calibration of the antenna array of the base station and removing distortion.

20. The non-transitory computer readable storage medium of claim 19, wherein the operations further comprise:
(i) responsive to determining that the power of the second interference reduced feedback signal does not satisfy the selection criteria, setting the current estimation of the impairment function to be the previous estimation of the impairment function; and
(j) repeating (d) to (j) until the power of the second interference reduced feedback signal satisfies the selection criteria.

21. The non-transitory computer readable storage medium of claim 19, wherein determining that the power of the second interference reduced feedback signal satisfies the selection criteria includes determining that the power of the second interference reduced feedback signal is smaller than a predetermined threshold.

22. The non-transitory computer readable storage medium of claim 19, wherein determining that the power of the second interference reduced feedback signal satisfies the selection criteria includes determining that a change in power of the second interference reduced feedback signal is smaller than a predetermined threshold.

23. The non-transitory computer readable storage medium of claim 19, wherein determining a first interference reduced feedback signal includes:
aligning the feedback signal and the input signals; and
removing interference from the feedback signal to obtain the first interference reduced feedback signal, wherein the interference is determined based on the previous estimation of the impairment functions as applied to the input signals.

24. The non-transitory computer readable storage medium of claim 23, wherein to remove the interference is performed in at least one of a time domain and a frequency domain.

25. The non-transitory computer readable storage medium of claim 19, wherein causing the use of the current estimation of the impairment function for each one of the plurality of transmit paths for calibration of the antenna array includes:
causing a determination, for each of the transmit paths, of a set of weights of an all-pass filter, wherein the all-pass filter has a frequency response that approximates the current estimation of the impairment function in an occupied frequency region, where signal power of the input signals is above a threshold; and causing the set of weights to be inversed to obtain equalizer taps for each of the transmit paths.

26. The non-transitory computer readable storage medium of claim 19, wherein causing the use of the current estimation of the impairment function for each one of the plurality of transmit paths for calibration of the antenna array includes:

causing a synthetization, for each of the transmit paths, of a set of equalizer taps that has a frequency response that approximates an inverse of the current estimation of the impairment function in an occupied frequency region where the signal power of the input signals is above a threshold.

27. The non-transitory computer readable storage medium of claim 25, wherein the operations further comprise causing the equalizer taps to be applied to the input signals before the input signals enter the transmit paths to remove the distortion incurred by the transmit paths.

* * * * *